(12) United States Patent
Zhou et al.

(10) Patent No.: US 8,503,482 B2
(45) Date of Patent: Aug. 6, 2013

(54) INTERCONNECTS USING SELF-TIMED TIME-DIVISION MULTIPLEXED BUS

(75) Inventors: Ting Zhou, Alameda, CA (US); Robin J. Tang, San Jose, CA (US); Ephrem C. Wu, San Mateo, CA (US); Tezaswi Raja, San Jose, CA (US)

(73) Assignee: LSI Corporation, San Jose, CA (US)

( * ) Notice: Subject to any disclaimer, the term of this patent is extended or adjusted under 35 U.S.C. 154(b) by 242 days.

(21) Appl. No.: 13/123,124

(22) PCT Filed: Nov. 19, 2008

(86) PCT No.: PCT/US2008/083974
§ 371 (c)(1),
(2), (4) Date: Apr. 7, 2011

(87) PCT Pub. No.: WO2010/059150
PCT Pub. Date: May 27, 2010

(65) Prior Publication Data
US 2011/0211582 A1    Sep. 1, 2011

(51) Int. Cl.
*H04J 3/00* (2006.01)
*H04J 3/06* (2006.01)
(52) U.S. Cl.
USPC .......................................... 370/498; 370/503
(58) Field of Classification Search
USPC ................... 370/498, 503, 509, 512
See application file for complete search history.

(56) References Cited

U.S. PATENT DOCUMENTS

| | | | |
|---|---|---|---|
| 5,919,265 A | 7/1999 | Nishtala et al. | |
| 6,560,215 B1 * | 5/2003 | Bloem et al. | 370/347 |
| 6,975,653 B2 * | 12/2005 | Eidson | 370/503 |
| 2001/0044861 A1 | 11/2001 | Niwa | |
| 2002/0135408 A1 | 9/2002 | Chiu | |
| 2002/0186716 A1 * | 12/2002 | Eidson | 370/503 |
| 2004/0039857 A1 * | 2/2004 | Takeda | 710/100 |
| 2004/0049616 A1 | 3/2004 | Dunstan | |
| 2005/0066097 A1 | 3/2005 | Kawomoto et al. | |
| 2005/0102125 A1 * | 5/2005 | Tseng | 703/14 |
| 2009/0245291 A1 * | 10/2009 | Wolfe et al. | 370/503 |

FOREIGN PATENT DOCUMENTS

| | | |
|---|---|---|
| CN | 101055479 | 10/2007 |
| EP | 1513069 | 3/2005 |
| JP | 167560 A | 2/1998 |
| JP | 49488 A | 6/1999 |

* cited by examiner

*Primary Examiner* — Hong Cho
(74) *Attorney, Agent, or Firm* — Luedeka Neely Group, P.C.; Rick Barnes

(57) ABSTRACT

A method of sending signals, including data and timing information, between transportation units on a communication bus of an integrated circuit, by generating clock triggers for every transportation unit on the bus, thereby initiating each preceding one of the transportation units to start sending the signals in a wave-front to an adjacent succeeding one of the transportation units, where the wave-front is initiated at each of the transportation units at a common point in time, and every transportation unit applying a timing adjustment to at least one of the data and timing information that it receives in the signals from the preceding transportation unit, to at least one of (1) capture the data from the preceding transportation unit, (2) relay the data without modification from the preceding transportation unit to the succeeding transportation unit on the communication bus, and (3) load new data to the communication bus, with updated timing information in a succeeding wave-front.

24 Claims, 7 Drawing Sheets

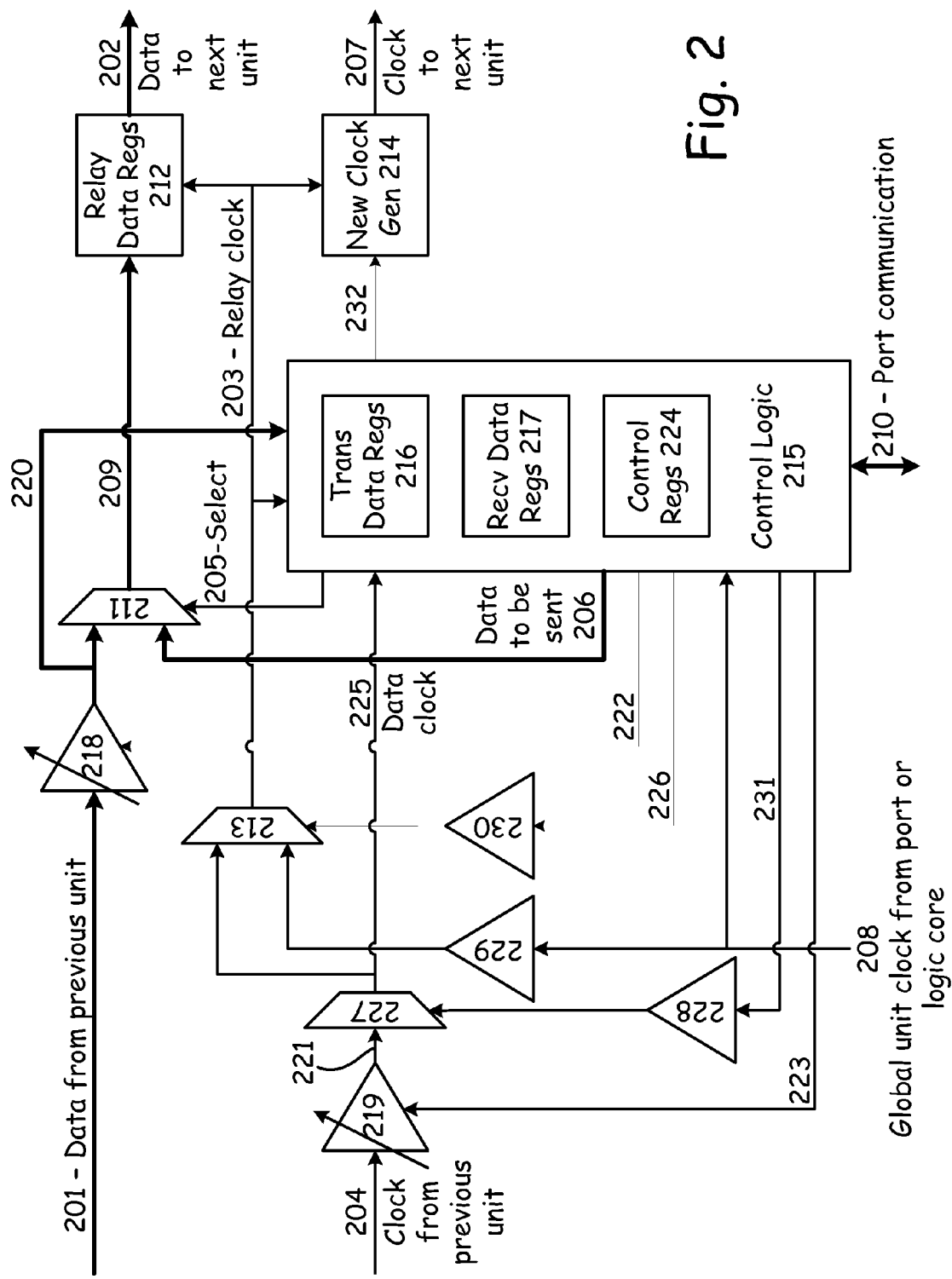

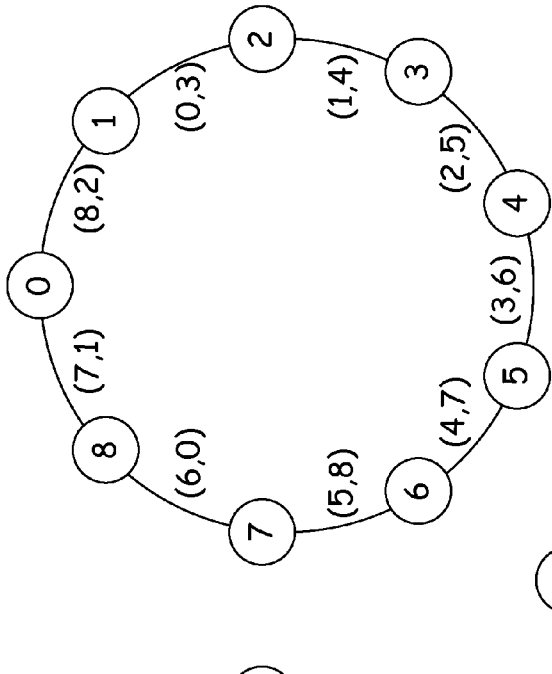
Fig. 5A
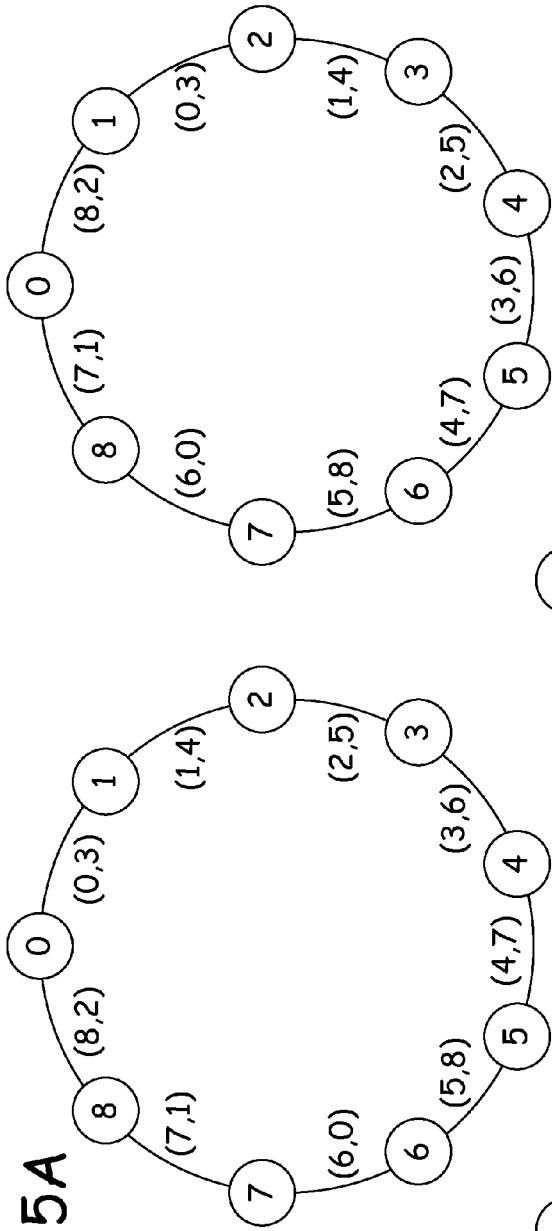
Fig. 5B
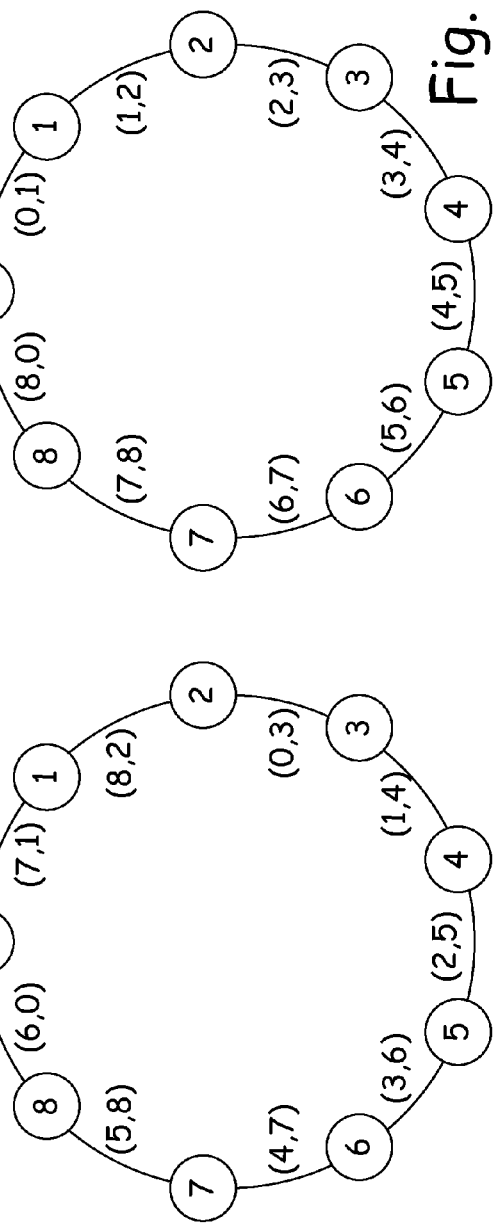
Fig. 5C
Fig. 5D

INTERCONNECTS USING SELF-TIMED TIME-DIVISION MULTIPLEXED BUS

This application claims all benefits and priority on prior pending patent application PCT/US2008/083974 filed 2008.11.19. This invention relates to the field of integrated circuits. More particularly, this invention relates to interconnection designs for integrated circuits.

FIELD

Background

High-speed on-chip interconnects are used in a great variety of applications, such as network switch fabrics, storage switches, input/output virtualization switches, multi-core central processing unit interconnects and new network-on-chip products. Each application has its unique requirements for interconnection. One type of interconnection design is called point-to-point (P2P). In its most basic form, a point-to-point interconnection design provides a dedicated wire between every two points of the integrated circuit that need to be connected. Obviously, point-to-point connections tend to have a relatively high number of interconnections in comparison to the number of points being connected.

The complexity of such basic point-to-point connections usually makes them prohibitive to implement in a given integrated circuit design. These direct point-to-point connections require $N*(N-1)*W$ wires, where N is the number of ports (points) and W is the width in bits of the connection between any two given ports. The total number of interconnection wires has a property of $O(N^2)$. For example, in one architecture where N is 14 and W is 160, the point-to-point arbitration traffic requires 29,120 interconnection wires.

This large number of interconnected wires also creates routing congestion among the interconnected ports. In response to the congestion, the ports have to be placed further apart to allow more routing channel space, and hence the length of the interconnection becomes longer.

The longer wires not only slow down the interconnection but also consume more power, which results from two related effects of the longer wires, which are the higher wire load and the additional number of intermediate buffers that might be required to meet timing requirements. The increasing ratio of wire-delay versus gate-delay in deep sub-micron processes is a further detrimental factor. As the transistor feature size continues to shrink, the wire-shrink is not scaling well with it.

What is needed, therefore, is a system that overcomes problems such as those described above, at least in part.

SUMMARY

The above and other needs are met by a method of sending signals, including data and timing information, between transportation units on a communication bus of an integrated circuit, by generating clock triggers for every transportation unit on the bus, thereby initiating each preceding one of the transportation units to start sending the signals in a wave-front to an adjacent succeeding one of the transportation units, where the wave-front is initiated at each of the transportation units at a common point in time, and every transportation unit applying a timing adjustment to at least one of the data and timing information that it receives in the signals from the preceding transportation unit, to at least one of (1) capture the data from the preceding transportation unit, (2) relay the data without modification from the preceding transportation unit to the succeeding transportation unit on the communication bus, and (3) load new data to the communication bus, with updated timing information in a succeeding wave-front.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 2 is a functional block diagram of a port transportation unit according to an embodiment of the present invention.

FIGS. 5A-5D are representations of data in transit from source ports to destination ports, according to system clock snapshots, according to another embodiment of the present invention.

DETAILED DESCRIPTION

Figure 1A:
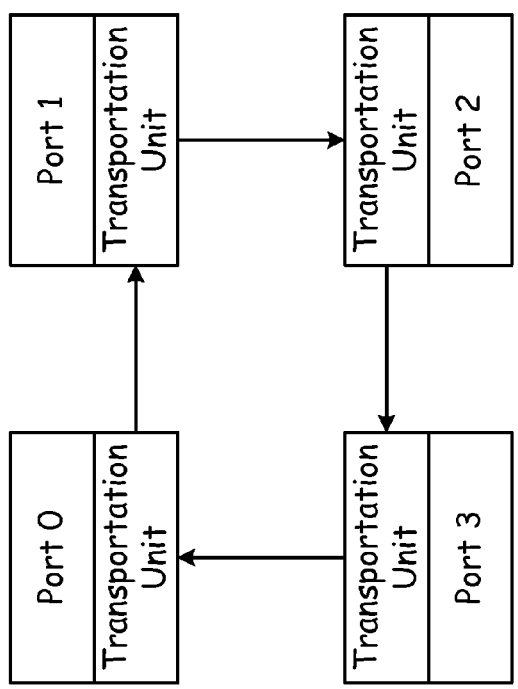
FIG. 1A is a unidirectional daisy chain loop interconnection topology.
Figure 1B:
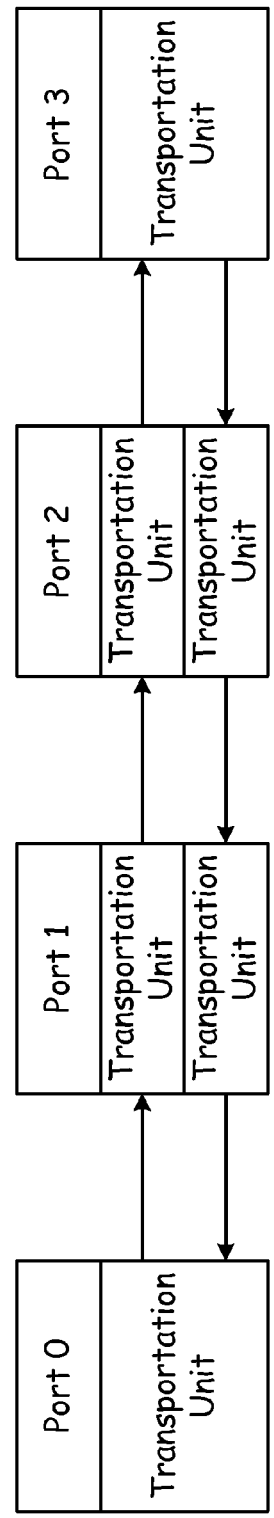
FIG. 1B is a bidirectional daisy chain interconnection topology.

The fundamental structure of the embodiments according to the present invention is a daisy chain of connected ports. FIG. 1 shows two examples of four daisy chained ports. FIG. 1A depicts a ring-like daisy chain in a unidirectional loop. FIG. 1B depicts an open ended daisy chain configuration, where bidirectional connections make it a bidirectional loop. Note, though, that while the chain flow in FIG. 1A is unidirectional, additional chain connections and transportation units could be added to the topology to make bidirectional connections.

The basic forms of the design embodiments described herein according to the present invention are designated as a self-timed Time Division Multiplexed (TDM) bus with a daisy chain loop configuration, similar to that as depicted in FIG. 1A, with wave-front relay self-timing, instead of a local very-high-frequency clock generator. The communication lines depicted herein, such as between the transportation units in FIG. 1, consist of two types of signals: data and self-timing clocks. Synchronized data and self-timing clocks are sent out from one transportation unit to the next transportation unit along the flow path. Data is self-timed and clocked by a delayed version of one of the self-timing clocks when it arrives at a unit, to provide for a reliable reception. If the data that arrives at the unit needs to be forwarded to a subsequent unit, then the data and the self-timing clocks are re-synchronized before the forwarding operation.

Transportation Unit

The transportation unit has three main functions, which are (1) transmission, (2) reception, and (3) relay with data and clock re-synchronization. In addition to these functions, the transportation unit also has a function control block that communicates with the ports, and also loads data to and takes data from the TDM bus at the proper time.

Figure 3:
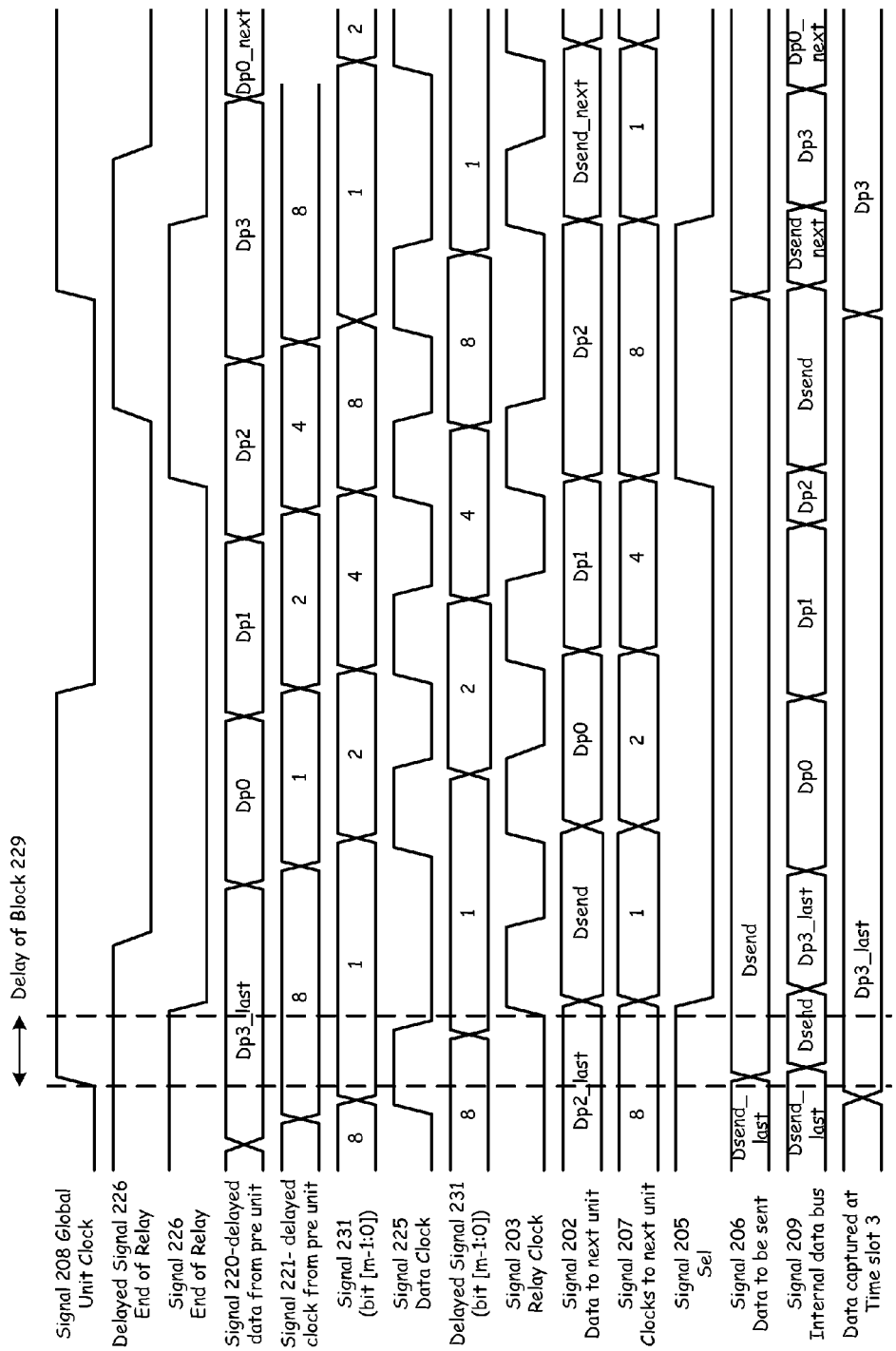
FIG. 3 is a representative signal timing diagram for the port transportation unit of FIG. 2.

FIG. 2 depicts a block diagram of the transportation unit. The transportation unit consists of clock selection circuits 213 and 227, data path multiplexer 211, control logic block 215, relay data registers 212, a new clock generation block 214, three delay blocks 228, 229, 230, and two selective adjustable delay blocks 218 and 219. There is one system clock input signal 208—the global unit clock—which is supplied to all the transportation units. FIG. 3 gives an example of a signal timing diagram for some of the transportation unit signals, with a time multiplexing factor of four.

The notation that is used in FIG. 3 includes: Dp0~Dp3: Data from the previous port, in an ascending order of when it is sent. Dp2_last, Dp3_last, Dp_0_next: The Dp2 and Dp3 from the last global unit clock cycle, and the Dp0 for next global unit clock cycle. Dsend: Data to be sent from this transportation unit to the next unit. Dsend_last, Dsend_next: The Dsend data from the last global unit clock cycle and the Dsend data for the next global unit clock cycle.

There are two types of signals between two neighboring transportation units, data and self-timing clocks. Signal 202 is data to the next unit, which becomes signal 201, data from the previous unit, when it arrives at the next unit. Similarly, signal 207, clocks to next unit, becomes signal 204, clocks from previous units, when it arrives at the next unit. The data is fed in a multi-bit payload. Self-timing clocks have M instances, where M is the number of relays that the units perform within one global unit clock cycle. The clock edge is defined as a rising or falling edge of signal 208, either one of which can be used as the global clock event for the transportation units.

One clock cycle is defined as the time between two consecutive ones of the selected type of clock edges (rising or falling). At any given time, only one out of M instances of the self-timing clocks are active. Self-timing clocks are generated by block 214, the new clock generation block, through an M bit rotating shift register. The shift register in 214 is reset to 2M−1 using signal 232 during a system reset event. Then the shift register in 214 shifts at every clock edge of the relay clock signal 203. Shift register outputs from 214 are sent out as signal 207.

The self-timing clock selection circuit 227 is used to select the currently-active self-timing clock from signal 221—the delayed version of signal 204. The selection is made through a delayed version of signal 231, which is sent out by the control logic block 215. The selected self-timing clock then becomes signal 225, the data clock. The data clock 225 is sent to block 215, in which there is a rotating shift register, which is reset to 1 during a system reset event, and which is clocked by the data clock signal 225. The shift register outputs are sent out as signal 231, the delayed version of which is ANDed with signal 221, with the output then ORed to generate the self-timing clock selection outputs signal 225.

By using different amounts of delay as specified by the delay unit 228, the "on" time of the signal 225 can be adjusted, since the shift register is updated at the clock edge of signal 225, and hence signal 221 is updated. As a result, signal 221 selects the next active self-timing clock in the queue, which is "off" at the time of the selection update, and thereby turns signal 225 "off." The "off" time of signal 225 is determined by the timing of the clock edge of the selected active clock. This design self-tracks the required "on" time of signal 225 by observing the shift register state change that is driven by signal 225. Delay that is added by block 228 adds margin to the minimum "on" time signal 225, so that signal 225 meets a robust operation requirement from the flip-flops that are driven by it.

Signal 225 and the delayed version of signal 208 are selected by multiplex block 213 through a delayed version of signal 226 and a delayed version of an end of relay signal 226 from block 215. The output of block 213 becomes signal 203, the relay clock signal. Delay 229 is added between the global unit clock signal 208 and the input of block 213 to allow sufficient setup time at the relay data registers 212, when new data comes from the port or logic core on the global unit clock signal 208. FIG. 3 depicts the delay for these signals. When a delayed version of signal 208 is selected, the "on" time of signal 203 is also self-tracked through the state change of the end of relay signal 226, which is driven by the relay clock signal 203. Delay 230 adds margin to the "on" time of signal 203 for robustness of the circuit.

Control logic block 215 controls the timing and data flow of the transportation unit. It sends a selection signal 205 at a proper time to the multiplex block 211 to select between signal 220, the delayed version of signal 201, which is data from the previous unit, and signal 206, data to be sent, to be connected to internal data bus 209. Example timing can be found in FIG. 3. If signal 206 (data to be sent) is selected, then new data is loaded onto the bus, otherwise data from the previous unit is forwarded and made ready for the relay 212.

As governed by the relay clock signal 203, the data on the bus 209 is clocked into the relay data registers 212, the output of which becomes the data to next unit signal 202. To avoid hold time violations at the next unit with the signal 201, the transportation unit design optionally includes an adjustable delay block 218, which can be inserted when the circuit delay in a given design is not sufficiently long so as to guarantee an appropriate hold time. The control logic 215 also captures data at the proper time (synchronized to the data clock 225) from signal 220 when data addressed to this unit arrives. To ensure an appropriate setup time for the data capture, an optional adjustable delay block 219 can be applied to signal 204 before the selector block 213, if the selected self-timing clock comes too early to guarantee an adequate setup time.

The timing of loads delivered to the bus—and captures taken from the bus—an be programmable or hardwired. The control logic 215 contains a set of counter or shift registers. The counter or shift registers reset according to the global unit clock 208. The timing of loads and captures are represented in one embodiment as counter values that get compared to counter states, or a set of register bits that are looked up according to the content of the shift register. The clock for the counter/shift registers is the relay clock signal 203.

The above mechanism can also be used to generate the end of relay signal 226. Signal 226 is reset to be asserted at a system reset. FIG. 3 shows an example of how data is loaded to the bus at the first relay clock edge 203 after the signal 208 clock edge. Data capture is enabled at the fourth relay clock edge 203 and captured at the fourth data clock edge 226. Finally, the end of relay signal 226 is also set at the fourth relay clock edge 203. A pipeline architecture can be applied to the design. For example, signal 205 can be generated one local clock earlier than signal 206 can be clocked into the relay registers 212. FIG. 3 shows an example of that.

Block 215 also contains three sets of registers: transmission data registers 216, receiving data registers 217, and control registers 224. The transmission registers 216 supply the data to be loaded on the bus, and the receiving registers 217 are a one level FIFO that store data that is captured from the bus. Control registers 224 contain control information. The control registers 224 are mostly configuration registers—for example, adjustable delay settings that drive signals 222 and 223, flow control registers that control timing of loads and captures, and so forth. The registers are set or read by corresponding port logic elements or a host that communicates with them through the port communication channel 210.

When signal 202 is latched at the local clock, a new clock to next unit signal 207 is generated at the same time by block 214 as described earlier in this section. The transportation unit as described in this section can be implemented as multiple copies, each having a limited data bus width, if the overall width of the data bus is too large.

Wave-Front Relay

Each transportation unit along the daisy chain loop starts to transmit data and a sync bit (or bits) at the global unit clock edge. Each unit receives data and clocks—self-timing information to use a more generic term—from a previous port according to the loop flow direction, including wire delay between the two ports. Each unit then recovers and generates a relay clock from the received sync bits with an adjustable delay. The regenerated local relay clock then clocks in the received data and generates new sync bits at the same time, to send to the next port in the ring. This design allows transmitted data and sync bits to be relayed to the next port, as well as to be re-synchronized at each transportation unit. This relay process continues until the data reaches its destination. In some embodiments, all relay processes are finished within one global clock cycle. The above process then repeat with every global unit clock cycle.

Figure 4A:
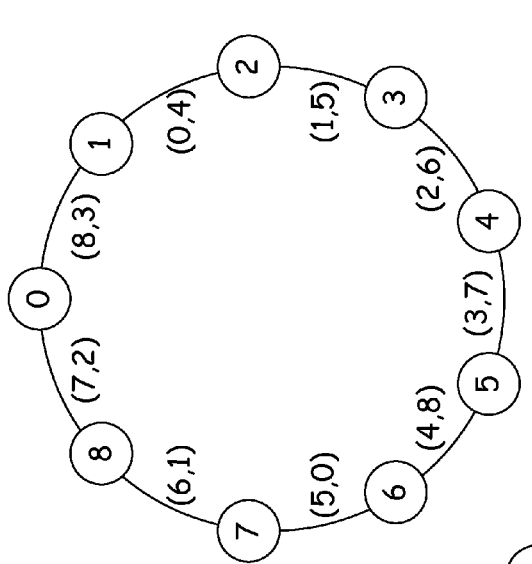
FIGS. 4A-4D are representations of data in transit from source ports to destination ports, according to system clock snapshots, according to an embodiment of the present invention.
Figure 4B:
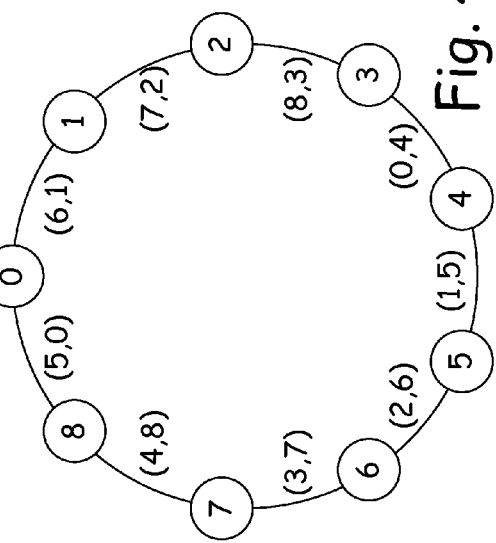
Figure 4C:
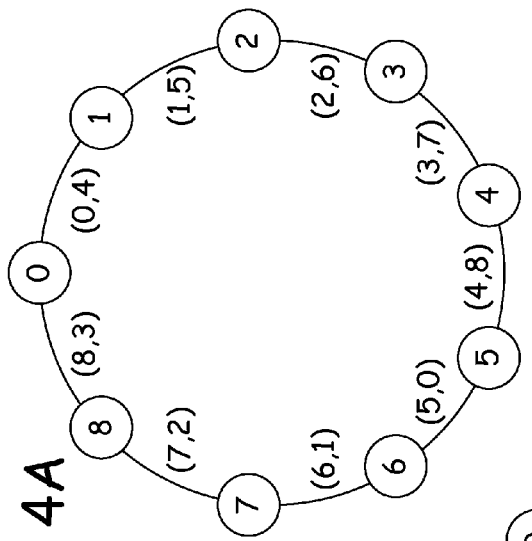
Figure 4D:
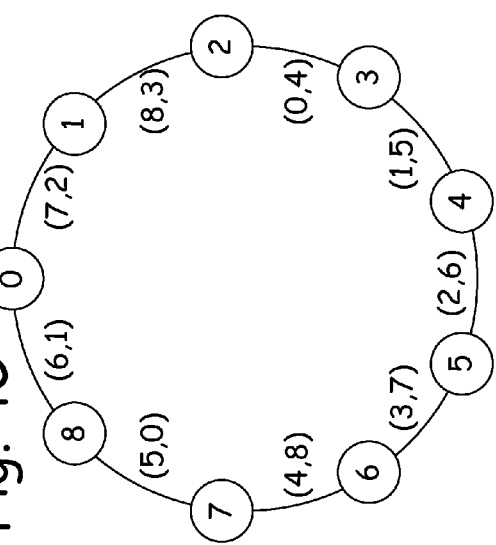

One example of the relay process is depicted in FIGS. 4A-4D, where:
 N=Number of ports in the point-to-point communication system
 T=Number of times slots on the bus
  =(N−1) in this embodiment, for simplicity
 (s,d)=Data from the source port s to the destination port d
 F((s,d))=Distance between the source and destination ports=(d−1)mod(N)
 t∈(0, 1, . . . , T−1)=Timeslot In this example there are nine transportation units labeled 0-8, and depicted as numbered circles. However, it is appreciated that there could be a greater or lesser number of transportation units than this. To start the cycle, every port (transportation unit) sends data at the same time to a counterpart port that is four ports away in a clock-wise direction, which step ends when the data arrives at the destination port, three relay stages later. In FIG. 4A, t=0 (synchronized to the system clock), and data departs from the source ports. As depicted in FIG. 4, the data at each given time is depicted en route between two ports, with the notation (source port, destination port). In FIG. 4B, t=1, and the data is in transit. In FIG. 4C, t=2 and the data is still in transit. In FIG. 4D, t=3, and the data arrives at the destination ports.

Point-To-Point Interconnection

As mentioned above, point-to-point interconnection among N ports requires N*(N−1)*W connections, where W is the number of bits of information that are sent from one port to one other port, assuming W is the same across all of the ports. Using the TDM bus proposed herein significantly reduces the required number of wire interconnections. One way to achieve this savings is to establish N−1 separate daisy chains that connect N ports together. Each daisy chain is W+n bits wide, where n is the number of synchronization bits that are used per daisy chain. The function of each daisy chain is listed in Table 1, below. In this embodiment, the distance between each destination port and each source port is the same for all of the ports in the chain.

TABLE 1

Point-To-Point Daisy Chain Function Table

| Chain Index | Source Port Index | Destination Port Index | Data Travel Time (in number of local clock cycles) |
|---|---|---|---|
| 1 | Any port m | (m + 1) mod N | 1 |
| 2 | Any port m | (m + 2) mod N | 2 |
| ... | ... | ... | ... |
| N − 2 | Any port m | (m + N − 2) mod N | N − 2 |
| N − 1 | Any port m | (m + N − 1) mod N | N − 1 |

Savings Over Direct P2P Connection in Number of Connections

Using the same assumptions as above, the number of connections for a direct point-to-point connection is $N*(N-1)*W$. The number of connections for a TDM point-to-point connection can be calculated as $(N-1)*(W+n)$, as Table 1 shows. So the "wire savings" is calculated as:

$$\frac{\text{Number of } P2P \text{ connections with } TDM \text{ bus}}{\text{Number of direct } P2P \text{ connections}} = \frac{W+n}{W \times N} \approx \frac{1}{N},$$

if $n \ll W$

The savings over a direct P2P connection as measured in the total connection length of the interconnects is not calculated here, because it depends significantly on the actual port locations and routing plan. The total connection length in a TDM P2P connection can be calculated as given below, assuming that the port to port routing distance is a constant 1:

Total length $L=(N-1)^2 \times (W+n) \times l$

Further Optimization Reduces the Number of TDM Buses

Table 1 demonstrates a simple way to establish a P2P connection using a TDM bus, and demonstrates a significant reduction in the number of connections as compared to a direct P2P connection. The number of connections can be further reduced to about half, through bus time sharing. In this embodiment, a chain designated for data that has port destinations that are far away from the source ports can be paired with a chain whose data destinations are closer to the source ports. Table 2 depicts two embodiments of chain pairs that share one bus. The total number of chains reduces from N−1 to something within the range of (N−1)/2 to N/2+1, depending on whether N is odd or even, and the pairing scheme used. It is appreciated that there are other sharing schemes that are comprehended within the scope of the present invention that can be used to reduce the total number of interconnects.

TABLE 2

Examples of Chain Pairs

| Shared Chain Index | Source Port Index | First Destination Port Index | Second Destination Port Index | Data Travel Time (in number of local clock cycles) | | |
|---|---|---|---|---|---|---|
| | | | | 1st | 2nd | Total |
| Embodiment 1 | | | | | | |
| 1 | Any port m | (m + N − 1) mod N | (m + 1) mod N | N − 1 | 1 | N |
| 2 | Any port m | (m + N − 2) mod N | (m + 2) mod N | N − 2 | 2 | N |
| ... | ... | ... | ... | ... | ... | N |
| (N − 1)/2 N: odd | Any port m | (m + (N + 1)/2) mod N | (m + (N − 1)/2) mod N | (N + 1)/2 | (N − 1)/2 | N |
| N/2 N: even | Any port m | (m + N/2) mod N | N.A. | N/2 | | N/2 |
| Embodiment 2 | | | | | | |
| 1 | Any port m | (m + N − 1) mod N | | N − 1 | | N − 1 |
| 2 | Any port m | (m + N − 2) mod N | (m + 1) mod N | N − 2 | 1 | N − 1 |
| 3 | Any port m | (m + N − 3) mod N | (m + 2) mod N | N − 3 | 2 | N − 1 |
| ... | ... | ... | ... | ... | ... | ... |
| (N + 1)/2 N: odd | Any port m | (m + (N − 1)/2) mod N | N.A. | (N − 1)/2 | | (N − 1)/2 |
| N/2 + 1 N: even | Any port m | (m + N/2) mod N | (m + N/2 − 1) mod N | N/2 | N/2 − 1 | N − 1 |

FIG. 5 illustrates how the relay process works within the time share embodiment, with the same definitions for the terms as provided above in regard to FIG. 4. This example has N=9, with a first step destination of f=3 and a second step destination of f=1. In FIG. 5A, t=0 (synchronized to the system clock), and the data departs from the source ports. In FIG. 5B, t=1, and the data is in transit. In FIG. 5C, t=2 and the data arrives at the destination ports for f=3, where the data is newly staged for f=1. In FIG. 5D, t=3, and the data arrives at the destination ports for f=1.

Modifications can be made to the transportation unit control block 215 (as depicted in FIG. 2) to facilitate the time share embodiment. For example, the control logic can be modified such that it can load and capture more than once within a single global unit clock cycle, at proper timings. Correspondingly, the capacity of the registers 216 and 217 can be increased according to the chosen time share scheme, and the load and capture can be operated with the proper storage registers in a proper order.

Bi-Directional TDM Bus Improves System Performance

In some applications, the worst case delay for the proposed TDM bus, which is a result of passing through N−1 relay stages, might be too long to meet the speed requirements of the interconnection. Using a bi-directional TDM bus for chains that have a large number of relay stages can reduce the worst case number of relay stages from N−1 to (N−1)/2 when N is odd, and to N/2 when N is even. Table 3 provides an example of such a bi-directional TDM bus.

TABLE 3

Example of a Bidirectional TDM Bus

| Chain Index | Source Port Index | Destination Port Index | Direction | Data Travel Time (in number of local clock cycles) |
|---|---|---|---|---|
| 1 | Any port m | (m + 1) mod N | Clockwise | 1 |
| 2 | Any port m | (m − 1) mod N | Counter-Clockwise | 1 |
| 3 | Any port m | (m + 2) mod N | Clockwise | 2 |
| 4 | Any port m | (m − 2) mod N | Counter-Clockwise | 2 |
| ... | ... | ... | ... | ... |
| $\lfloor (N − 1)/2 \rfloor * 2 − 1$ | Any port m | $(m + \lfloor (N − 1)/2 \rfloor)$ mod N | Clockwise | $\lfloor (N − 1)/2 \rfloor$ |
| $\lfloor (N − 1)/2 \rfloor * 2$ | Any port m | $(m − \lfloor (N − 1)/2 \rfloor)$ mod N | Counter-clockwise | $\lfloor (N − 1)/2 \rfloor$ |
| N − 1 N: even | Any port m | (m + N/2) mod N | Clockwise or Counter-clockwise | N/2 |

It is appreciated that the bus time sharing technique described in the previous section can also be applied to a bidirectional TDM bus, to reduce the number of connections.

Port Architecture

Figure 6:
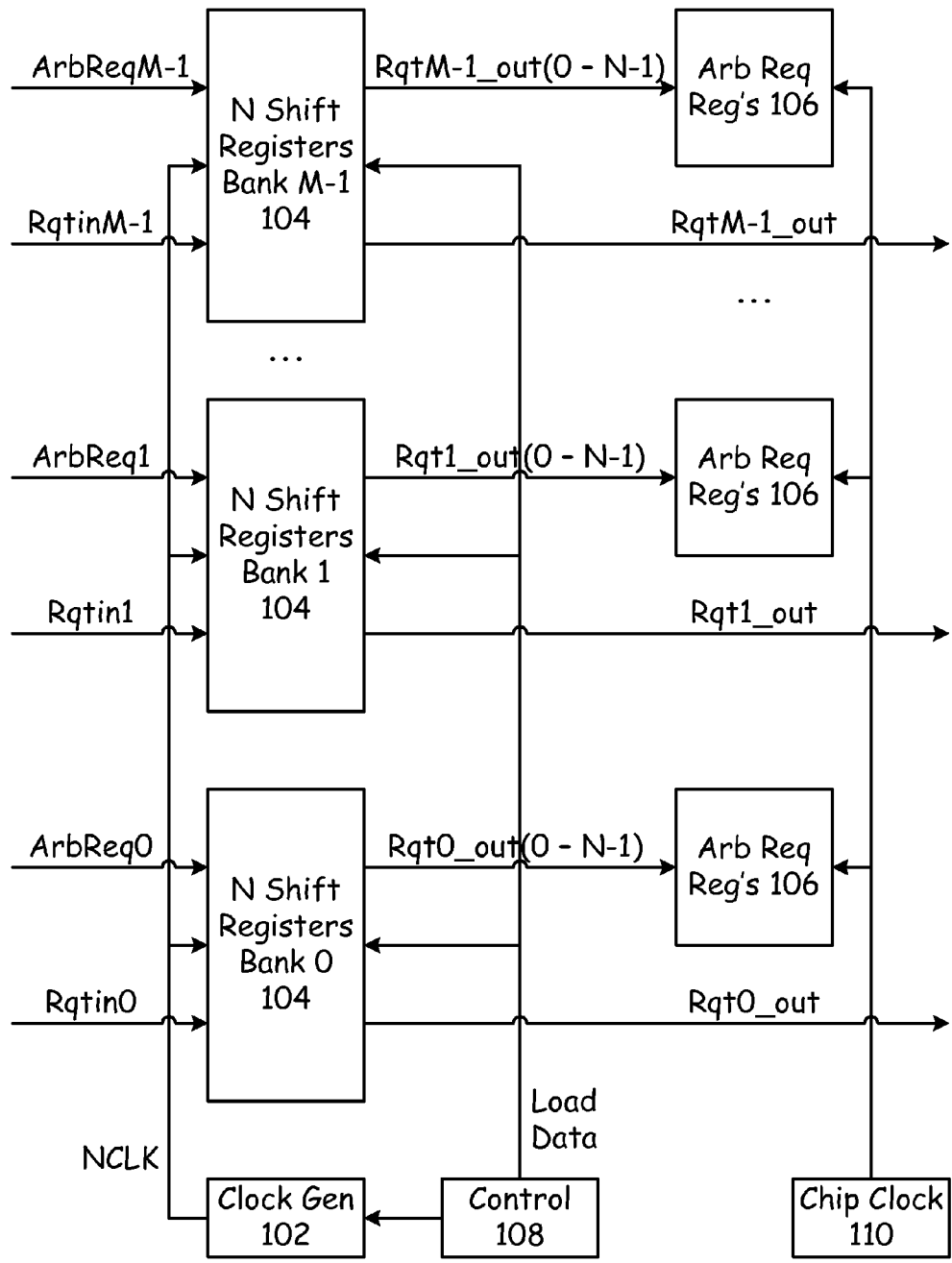
FIG. 6 depicts an embodiment of a portion of an N-port switch architecture, where each port can handle M arbitration requests.

With reference now to FIG. 6, there is depicted an embodiment of a portion of an N-port switch architecture, where each port 100 can handle M arbitration requests. Each arbitration request goes to each port 100, one of which ports 100 is depicted in FIG. 6. Therefore, there are M*N arbitraion requests in each port 100 and M*N*N total arbitration requests for all of the N ports 100. The N ports 100 can be connected as a bidirectional daisy chain as depicted in FIG. 1B, or in a unidirectional daisy chain loop or ring as depicted in FIG. 1A. In the embodiment depicted in FIG. 6, the daisy chain is configured as a unidirectional ring, such that Port 0 transmits the arbitration requests to Port 1 via physical wires, Port1 transmits to Port2, and so on. Port 0 receives the arbitration requests directly from Port N−1.

Each port 100 includes a clock generator 102 that operates at a frequency that is K times greater than the signal that it receives from the chip clock 110. The port 100 also has M banks of shift registers 104, where each of the M banks has N shift registers, which are used for temporary storage. The port 100 also includes arbitration request registers 106.

Each arbitration request is associated with one of the banks 104 of N shift registers. Each register in the appropriate bank 104 of N shift registers stores a request that comes from one of the N ports 100. By shifting the arbitration request from one register to another register within the appropriate bank 104 of shift registers, the N shift registers contain the corresponding arbitration requests from all of the ports 100. As depicted in FIG. 6, signals ArbReq0, ArbReq1, . . . . ArbReqM−1 are arbitration requests that are generated from the arbitration unit, which requests go to the N ports 100 for arbitration.

The requests are loaded into Reg0 of the appropriate bank 104 of shift registers at the rising edge of the chip clock 110 signal, when the load data (LD) signal is asserted. Control block 108 outputs the load data signal to register Reg0 of every bank 104 of N shift registers, to initiate the loading of the arbitration requests into the ring structure. The load data signal is asserted when the clock generator 102 is disabled, which occurs when the chip clock 110 signal is low, and then the load data signal is de-asserted after the rising edge of the NCLK signal.

Rqtin0, Rqtin1, . . . . RqtinM−1 are M ring signals that are received from the previous port 100, and are routed to the input of register Reg0 of every one of the M banks 104 of N shift registers. The outputs of Reg0 (Rqt0_out0, Rqt1_out0, . . . . RqtM−1_out0) are routed to the inputs Rqtin0, Rqtin1, . . . , RqtinM−1 of the next port 100 in the ring or chain.

After ArbReq0, ArbReq1, . . . ArbReqM−1 are loaded into the registers, the Rqt0_out0, Rqt1_out0, . . . . RqtM−1_out0 signals contain the arbitration requests 0 of the corresponding port 100 after the first clock signal from the clock generator 102. The clock generator 102 is enabled on the rising edge of the chip clock 110 signal, and continues to be enabled until the internal counter in the control unit 108 reaches a predefined number of clock cycles. When the clock generator 102 is disabled, then no more clock signals are generated, and the clock signal NCLK stays low until the next rising edge of the chip clock 110 signal. When the clock generator 102 generates a clock signal with N times the frequency of the chip clock 110 (K=N), then the internal counter in the control unit 108 disables the clock generator 102 when it counts to N and the arbitration requests from each port 100 are shifted to the desired port 100.

Because this is accomplished in just one chip clock 110 cycle, the latency of the operation is one. Similarly, this can also be accomplished when K=N/2 or K=N/4, etc., by modifying the control unit 108. The only difference is that it would then take two or four chip clock 110 cycles for the arbitration requests to go to the desired port 100. At the rising edge of the NCLK signal, each port 100 receives the arbitration requests from the previous port 100 of the ring at Reg0. These arbitration requests go to Reg1 of every one of the banks 104 of N shift registers on the next clock cycle. The output of Req1 goes to Reg2 on the next cycle, and so on.

Figure 7:
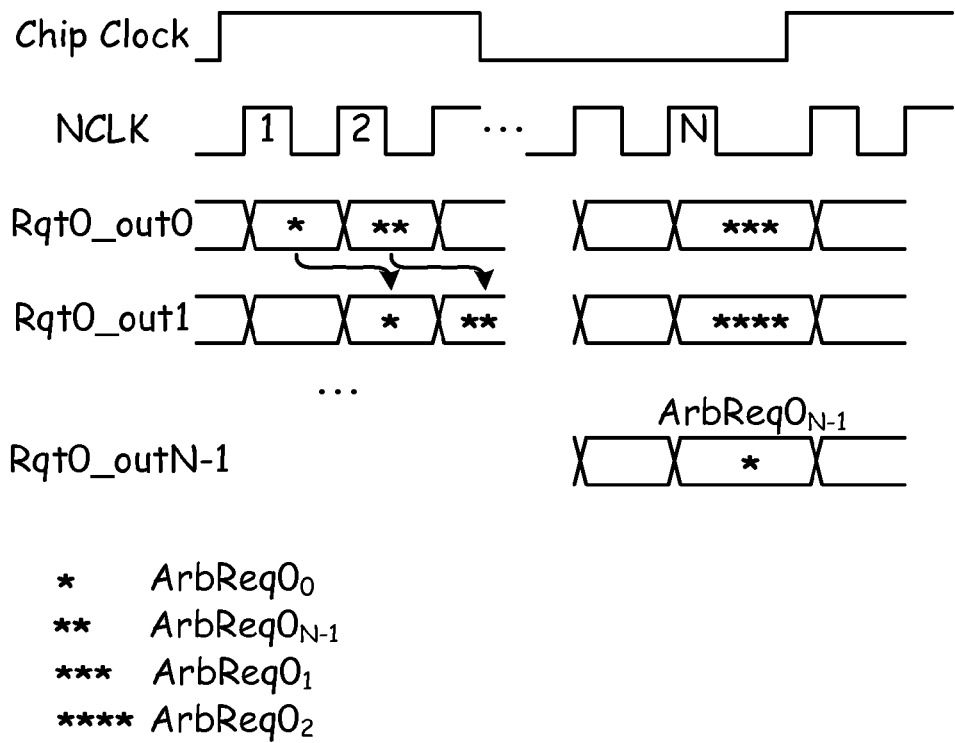
FIG. 7 depicts a timing diagram for an embodiment where N shift registers contain arbitration requests from any of N ports at the end of a chip clock cycle, where (K=N), and subscripts indicate the port number.

The output of the bank 104 of N shift registers goes to the arbitration request registers 106, and is latched at the next rising of the chip clock 110 signal. Because there are M banks 104 of N shift registers, there are M banks 110 of arbitration request registers. The output of the M banks 110 of arbitration request registers goes to the arbitration unit, to determine the connection between the ports 100. FIG. 7 depicts the timing diagram for how N shift registers 0 contain arbitration requests 0 from any of the N ports 100 at the end of the chip clock cycle, when (K=N), where subscripts indicate the port 100 number.

Summation

Thus, the various embodiments of the present invention newly describe a point-to-point TDM bus using a wave-front relay self-timing technique, a new design for a transportation unit, a TDM bus time share technique, and a bidirectional TDM bus.

The P2P TDM bus described herein significantly reduces the number of connections that are required between ports, as compared to a direct-link point-to-point topology. Specifically, the P2P TDM bus uses O(N) connections, while the direct P2P link bus requires $O(N^2)$ connections. Further, the P2P TDM bus significantly reduces the overall routing area that is required for a P2P connection. The P2P TDM bus can reduce the impact of wire delay by increasing wire width and pitch in exchange for a lesser number of interconnections. The P2P TDM bus described herein also reduces interconnect power dissipation due to reduced wire loads.

The wave-front relay self-timing technique described herein is a very effective technique for the P2P TDM bus. For every global unit clock cycle, all ports on the connected P2P network start by sending data and self-timing information to the next port down the chain. Meanwhile, every port is ready to receive data and self-timing information from the previous port in the chain. Each port uses the self-timing information to re-synchronize and then relay the data, and generates new self-timing information—along with the relayed data—to send to the next port down the chain. Each port extracts the clock signal from the incoming self-timing information, and in doing so removes any need for a high speed (multiple clock rate) clock at each port.

The wave-front relay self-timing technique described herein also reduces the matching requirement that is imposed by a local high frequency clock generator, and also removes any data/clock mismatching accumulation along the ports that are used for the synchronized relay. The wave-front relay self-timing technique also limits the relay process to just one global unit clock cycle, and re-synchronizes all of the relay process at the global clock edge, which prevents path mismatching accumulation from one relay process to the next. In addition, the wave-front relay self-timing technique increases daisy chain performance, because the relay delay is typically smaller than a local high frequency clock period.

The transportation unit of the present design features sync detection, local clock generation, data path load and capture functions, and data/sync bit(s) resynchronization, all of which enable the wave-front relay self-timing technique. Further, the transportation unit design as described herein features an additional delay between the unit clock and the start of the relay clock, which allows for the same unit clock cycle data to be used on the bus, and avoids extra clock cycle latency or extra storage. The transportation unit includes optional adjustable delays on the data path and the sync path, which allows the hold time and the setup time for relay to be adjusted separately. In addition, the transportation unit has a separate local clock for data relay and data capture, which allows more time for the data capture operation to finish, thus maximizing the use of the full unit clock cycle for transportation—this also permits a higher speed performance.

As mentioned above, the TDM bus time share technique described herein reduces the number of P2P TDM interconnections by about half, while the bi-directional design also doubles the P2P TDM bus system performance.

In alternate embodiments, the P2P TDM bus is simplified and modified for a crossbar application, with or without broadcasting. The P2P TDM bus can also be cascaded and bridged for multi-stage interconnects. If latency is allowed in a fast system, then the global unit clock speed can be reduce to multi system clock cycles, and the bus can be widened accordingly to meet the throughput requirement.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of sending signals, including data and timing information, between transportation units on a communication bus of an integrated circuit, the method comprising the steps of:
    generating clock triggers for every transportation unit on the bus, thereby initiating each preceding one of the transportation units to start sending the signals in a wave-front to an adjacent succeeding one of the transportation units, where the wave-front is initiated at each of the transportation units at a common point in time, and
    every transportation unit applying a timing adjustment to at least one of the data and timing information that it receives in the signals from the preceding transportation unit, to at least one of (1) capture the data from the preceding transportation unit, (2) relay the data without modification from the preceding transportation unit to the succeeding transportation unit on the communication bus, and (3) load new data to the communication bus, with updated timing information in a succeeding wave-front.

2. The method of claim 1, wherein the communication bus is a crossbar communication bus.

3. The method of claim 1, further comprising the steps of propagating the wave front until one global unit clock cycle is completed, and then restarting the wave-front with a next global unit clock cycle.

4. The method of claim 1, further comprising the step of propagating the wave front until the data reaches an intended transportation unit.

5. The method of claim 1, wherein the timing adjustment is a path delay adjustment.

6. The method of claim 1, wherein the step of generating clock triggers for every transportation unit is accomplished by sending a global unit clock signal to every transportation unit.

7. The method of claim 1, wherein the step of generating clock triggers for every transportation unit is accomplished by sending a global unit clock signal to the transportation units, and generating multiple clock triggers for one global unit clock signal.

8. The method of claim 1, wherein the step of generating clock triggers for every transportation unit is accomplished by an internal clock disposed within each transportation unit.

9. The method of claim 1, wherein none of the transportation units have independent internal clocks.

10. The method of claim 1, wherein all of the data sent from each of the preceding transportation units reaches each of the succeeding transportation units within one global unit clock cycle.

11. The method of claim 1, wherein the communication bus is a time division multiplexed bus.

12. The method of claim 1, wherein the timing adjustment applied to the data is different from the timing adjustment applied to the timing information.

13. The method of claim 1, wherein the data and the timing information is sent in the signal simultaneously.

14. The method of claim 1, wherein a selection of multiple clock signals is applied to the timing information in the transportation units.

15. The method of claim 1, wherein a selection of multiple clock signals is created with shift registers.

16. The method of claim 1, wherein a selection of multiple clock signals is selected with a selection signal that has a same number of bits as a number of clock signals, one bit in the selection signal for each clock signal.

17. The method of claim 1, wherein a selection signal selects one of multiple clock signals after a current global clock edge is applied.

18. The method of claim 1, wherein separate clock signals are used for data relay and data capture operations, where more time is allowed for a data capture operation.

19. The method of claim 1, wherein the communication bus is a bidirectional bus.

20. A transportation unit for a signal bus, the transportation unit comprising:
    a data input for receiving input data,
    a relative clock input for receiving a relative clock signal,
    a global clock input for receiving a global clock signal,
    a data output for providing output data,
    a clock output for providing an output clock signal,
    a communication port,
    a control logic for,
        selecting one of the relative clock signal and the global clock signal for use as a relay clock signal, where the relay clock signal is used to stage the providing of the output data and to generate the output clock signal,
        receiving the input data that is address to the transportation unit,
        receiving the new data on the communication port,
        selecting one of the input data and the new data to be provided as the output data,
        providing the input data that is addressed to the transportation unit on the communication port, and
        receiving instructions on the communication port.

21. The transportation unit of claim 20, further comprising a delay unit for selectively applying a variable delay to the relative clock signal under control of the control logic.

22. The transportation unit of claim 20, further comprising a delay unit for selectively applying a variable delay to the input data under control of the control logic.

23. The transportation unit of claim 20, wherein the output data and the output clock signal are provided simultaneously.

24. The transportation unit of claim 20, wherein the input data is received and the output data is provided on a common clock signal.

* * * * *